Dec. 10, 1963  B. TOCCI-GUILBERT  3,113,407
RESILIENT COUPLING
Filed March 8, 1961  2 Sheets-Sheet 1
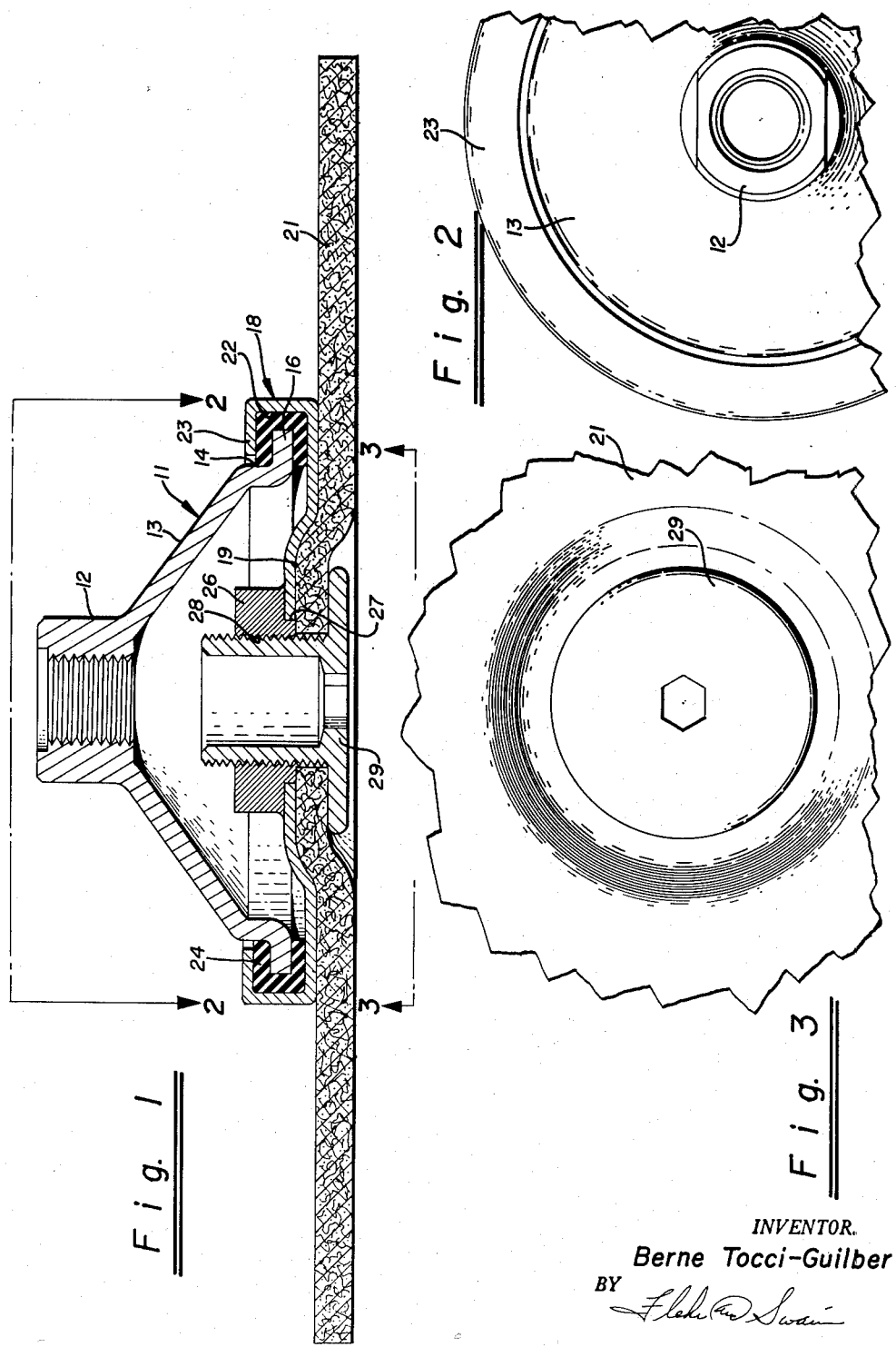
INVENTOR.
Berne Tocci-Guilbert
BY
Attorneys Dec. 10, 1963   B. TOCCI-GUILBERT   3,113,407
RESILIENT COUPLING Filed March 8, 1961   2 Sheets-Sheet 2

INVENTOR.
Berne Tocci-Guilbert
BY
Attorneys

United States Patent Office 3,113,407
Patented Dec. 10, 1963

3,113,407
RESILIENT COUPLING
Berne Tocci-Guilbert, 2323 Larkin St.,
San Francisco, Calif.
Filed Mar. 8, 1961, Ser. No. 94,243
8 Claims. (Cl. 51—195)

This invention relates to a resilient coupling and more particularly to a resilient coupling for mounting grinding wheels on the spindle shaft of power tools.

Resilient mountings have heretofore been provided for mounting grinding wheels on the spindle shafts of power tools. However, such resilient mountings have not been fail-safe in the event the resilient means utilized in the mounting failed. In addition, such resilient mountings have been relatively expensive to manufacture and assemble.

In general, it is an object of the present invention to provide a resilient mounting for mounting grinding wheels on the spindle shafts of power tools which is fail-safe.

Another object of the invention is to provide a resilient mounting of the above character in which the mounting cannot come apart in the event the resilient means utilized within the mounting should fail.

Another object of the invention is to provide a resilient mounting of the above character which is relatively inexpensive to manufacture and assemble and whose tolerances can be more closely controlled thus eliminating a high percentage of rejects.

Additional objects and features of the invention will appear from the following description in which the preferred embodiments are set forth in detail in conjunction with the accompanying drawings.

Referring to the drawings:

FIGURE 1 is a side elevational view in cross-section of a resilient coupling incorporating my invention.

FIGURE 2 is a top plan view looking along the line 2—2 of FIGURE 1.

FIGURE 3 is a bottom plan view looking along the line 3—3 of FIGURE 1.

Figure 4:
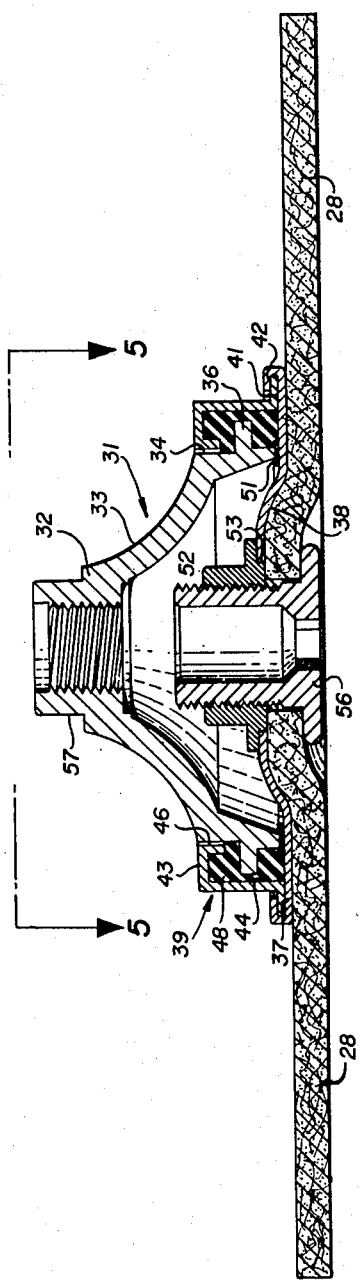
FIGURE 4 is a side elevational view in cross-section of another embodiment of my resilient coupling.

In general, my resilient coupling for mounting grinding wheels on the spindle shaft of a power tool is comprised of a hub which is adapted to be connected to the spindle shaft and which is provided with a radially extending flange. A backup plate is provided which has an annular groove which accommodates the radially extending flange of the hub. Resilient means such as rubber disposed within the annular groove serves to seat the radially extending flange of the hub to provide a resilient connection between the hub and the backup plate. Means is provided for connecting the grinding wheel to the backup plate.

As shown in the drawings, my resilient mounting for mounting a grinding wheel on the spindle shaft of a power tool consists of a hub 11 which is generally bell-shaped in form as shown in FIGURE 1. The hub is provided with an internally threaded cylindrical portion 12 which is adapted to be mounted on the spindle shaft of the power tool in a manner well known to those skilled in the art. The hub also includes a tapered or inclined portion 13 and a short cylindrical portion 14. The lower extremity of the portion 14 is connected to a radially extending flange 16. A backup plate 18 of suitable material such as sheet metal is mounted on the hub 11 in a manner as hereinafter described. The backup plate is substantially in the form of a circular plate which is provided with an inner dished portion 19 which is adapted to accommodate the contour of a conventional depressed center or raised center grinding wheel 21 of a type well known to those skilled in the art. The backup plate is also provided with an annular groove 22 which is substantially square in cross-section as shown in FIGURE 1 and which, as shown, has a width which is substantially greater than the thickness of the radially extending flange 16. It will also be noted that the groove 22 likewise has a depth which is substantially greater than the length of the radially extending flange 16. As also can be seen from FIGURE 1 of the drawings, the annular groove 22 is formed by a portion 23 of the backup plate 18 which overlies the flange 16 for a purpose hereinafter described.

Suitable resilient means such as molded rubber 24 is disposed within the groove 22 and seats the annular flange 16 in such a manner that the annular flange is spaced from all portions of the backup plate to eliminate metal-to-metal contact so that the flange 16 is resilient mounted within the backup plate. The molded rubber insert 24 is formed in such a manner that the rubber is substantially disposed within the annular groove 22.

A cylindrical hub 26 for the backup plate is fixed to the backup plate by suitable means such as welding and is mounted within a centrally disposed opening 27 provided in the backup plate. The cylindrical hub 26 is provided with a threaded central opening 28 which is adapted to receive a flanged retaining nut 29 of a type well known to those skilled in the art for securing the grinding wheel 21 to the backup plate as shown particularly in FIGURE 1 of the drawing.

Operation and use of the resilient coupling as shown in FIGURES 1–3 of the drawing may now be briefly described as follows. As explained above, the resilient coupling can be utilized for mounting the grinding wheel 21 on the spindle shaft of the power tool by first threading the cylindrical portion 12 onto the spindle shaft and then securing the grinding wheel 21 to the resilient coupling by the retaining nut 29. From the construction of the resilient coupling, it can be seen that there is no direct metal-to-metal contact between the grinding wheel 21 and the spindle shaft to permit grinding operations well known to those skilled in the art and as described in my Patent No. 2,633,008.

The use of my resilient coupling is particularly advantageous in the event the rubber insert 24 utilized for making the resilient connection between the hub 11 and the backup plate 18 should fail, the radially extending flange 16 cannot escape from the annular groove 22 provided in the backup plate because of the overlying portion 23 of the backup plate. This, therefore, prevents the grinding wheel 21 from escaping from my mounting and causing injury and damage to material or individuals located nearby. The construction is also advantageous in that it is relatively simple and inexpensive to manufacture and assemble.

Figure 5:
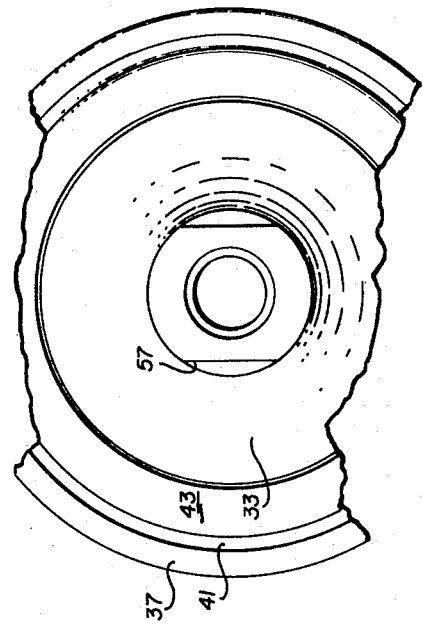
FIGURE 5 is a top plan view of the resilient coupling shown in FIGURE 4.

Another embodiment of my resilient coupling is shown in FIGURES 4 and 5. It consists of a hub 31 which also has an internally threaded, substantially cylindrical portion 32 which is adapted to be mounted on the spindle shaft of the power tool. The hub 31 is also substantially bell-shaped as is the hub 11. However, it does have a slightly different contour. Instead of a tapered portion such as the tapered portion 13, it has an arcuately curved portion 33 which presents an outer concave surface. The hub 31 is also provided with a lower cylindrical portion 34 upon which is formed, between its upper and lower margins, a radially extending flange 36 that is provided with upper and lower serrated surfaces as shown in the drawing.

A circular backup plate 37 is mounted on the hub 31 as hereinafter described. The backup plate 37 is provided with a raised or dished portion 38 in the same manner as the backup plate 18. A retaining ring 39 which is substantially cylindrical in form is secured to the backup plate 37. The retaining ring 39 is provided with an annular flange 41 which lies in the same plane as the plane of the backup plate 37 and is adapted to be engaged by a crimped-over portion 42 of the backup plate as shown in the drawing to firmly secure the retaining ring 39 to the backup plate. It is readily apparent that, if desired, other means can be provided for securing the retaining ring 39 to the backup plate as, for example, welding. The retaining ring 39 is provided with an additional portion 43 which lies in the same plane as the flange 41 and which overlies the backup plate. The retaining ring in combination with the backup plate 37 form an annular groove 44 which is adapted to accommodate the radially extending flange of the hub 31 as shown in the drawing. The retaining ring 39 is also provided with a downwardly depending portion 46 which is disposed in relatively close proximity to the cylindrical portion 34 of the hub.

It will be noted from the drawing that the combination of the backup plate 37, the retaining ring 39 and the hub 31 form an enclosed space about the radially extending flange 36 which is particularly advantageous for use as a mold for receiving the liquid resilient material utilized for providing the resilient means 48 disposed within the space surrounding the radially extending flange 36 and serving to mount the flange 36 within the grooves 44 in such a manner that the hub 31 is resiliently connected to the backup plate 37.

The liquid rubber or other suitable material can be inserted into the space in a suitable manner such as providing one or more small holes in the backup plate or in the retaining ring and pouring liquid resilient material such as rubber in through the holes into the space provided until it is filled. A gasket 51 of suitable material such as cork is disposed between the lower extremity of the hub 31 and the backup plate 37 to prevent the liquid rubber from flowing out of the annular space provided by the retaining ring, the backup plate and the hub, and into the central space within the hub 31. There is a slight space between the portion 46 of the retaining ring 39 and the hub. However, this space is normally so small that substantial liquid rubber will not flow out through this space. It also will be noted that if the liquid rubber is inserted through holes placed in the portion 43 of the retaining ring 39 with the backup plate facing downwardly, the liquid rubber will not flow out of the space between the portion 46 and the cylindrical portion 34 of the hub.

Another hub 52 is mounted in an opening 53 provided in the backup plate 37 and is fixed to the backup plate. The grinding wheel is adapted to be secured to the resilient coupling by a retaining nut 56 of a conventional construction in a manner well known to those skilled in the art.

The operation and use of this resilient coupling is substantially identical to the operation and use of the resilient coupling hereinbefore described. It should be noted that the cylindrical portion 32 of the hub 31 is provided with flats 57 which facilitate the mounting of the resilient coupling on the spindle shaft of the power tool.

Figure 6:
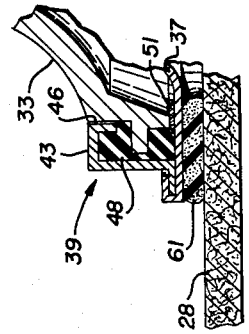
FIGURE 6 is a partial side elevational view in cross-section of still another embodiment of my invention.

Another embodiment of my invention is shown in FIGURE 6 which is substantially identical to that shown in FIGURE 4 with the exception that a circular pad 61 of suitable material such as foam rubber is disposed between the backup plate 37 and the grinding wheel 28. If desired, the resilient pad 61 can be secured to the backup plate or to the grinding wheel. However, it is believed preferable that the pad be affixed to the grinding wheel because it has been found that such pads were subject to wear and, therefore, must be frequently replaced if secured to the backup plate. When they are secured to the grinding wheels, they can be disposed of when the grinding wheel is worn out. The pads 61 can be secured to the grinding wheel in any suitable manner such as a pressure sensitive adhesive. The pads applied in this manner can carry a trademark in a suitable manner such as by a pressure sensitive paper label affixed to the pad.

The use of the resilient pads which have substantially the same diameter as the backup plate ensure that the backup plate will firmly backup the grinding wheel in the manner desired. The resilient pads serve to accommodate any irregularities in the rear surface of the grinding wheel and ensures that support is provided to all portions of the grinding wheel opposite the backup plate.

It is apparent from the foregoing that I have provided a new and improved resilient coupling or mounting which is relatively inexpensive and which is fail-safe. In any of the embodiments shown, the grinding wheels cannot escape from the hub in the event of failure of the resilient means utilized for connecting the hub to the backup plate. In addition, all of the embodiments are relatively simple and economical to manufacture and assemble. In fact, in one of the embodiments, the construction is such that the mounting itself serves as a mold for receiving the liquid rubber utilized for the resilient mounting. The resilient mounting extends over a relatively wide area to increase the stability of the resilient coupling.

I claim:

1. In a resilient coupling for mounting grinding wheels on the spindle shaft of a power tool, the resilient coupling comprising a hub adapted to be connected to the spindle shaft of the power tool and having a radially extending flange unitary thereto, a backup plate having an annular groove, the radially extending flange of the hub being seated within the groove, resilient means disposed within the groove and seating the radially extending flange within the groove to secure the hub to the backup plate and to prevent metal-to-metal contact between the radially extending flange and the backup plate, and means adapted to connect the grinding wheel to the backup plate.

2. A resilient coupling as in claim 1 wherein the backup plate is provided with portions which are disposed on both sides of the radially extending flange.

3. A resilient coupling as in claim 1 wherein the annular groove has dimensions which are substantially greater than the dimensions of the radially extending flange.

4. A resilient coupling as in claim 1 wherein the backup plate together with the hub form a relatively confined space for receiving the resilient means.

5. A resilient coupling as in claim 1 together with an additional pad of resilient material seated against the backup plate and adapted to be disposed between the backup plate and the grinding wheel.

6. A resilient coupling as in claim 1 wherein the backup plate is formed in two parts, one of the parts being a substantially circular plate and the other of the parts being a substantially cylindrical retaining ring, and means for securing the retaining ring to the circular plate.

7. In a resilient coupling for mounting grinding wheels on the spindle shaft of a power tool, the resilient coupling comprising a hub adapted to be connected to the spindle shaft of the power tool and having a radially extending flange formed integrally therewith, a backup plate, means mounted on the backup plate for forming an annular groove on one side thereof accommodating the radially extending flange, the groove having dimensions substantially greater than the dimensions of the radially extending flange, resilient means disposed within the groove and seating the radially extending flange within the groove to connect the backup plate to the hub and to prevent metal-to-metal contact between the radially extending flange and the means forming the groove, and means adapted to connect the grinding wheel to the backup plate.

8. A resilient coupling as in claim 7 wherein said backup plate, said means forming the groove and said hub provide a confined space forming a mold for receiving the resilient means.

References Cited in the file of this patent

UNITED STATES PATENTS

| | | |
|---|---|---|
| 1,864,080 | Madge | June 21, 1932 |
| 2,633,008 | Tocci-Guilbert | Mar. 31, 1953 |
| 2,883,805 | Limbers | Apr. 28, 1959 |